United States Patent
Rockwell et al.

(10) Patent No.: US 11,666,199 B2
(45) Date of Patent: Jun. 6, 2023

(54) APPLIANCE WITH CELLULOSE-BASED INSULATOR

(71) Applicant: Owens Corning Intellectual Capital, LLC

(72) Inventors: Anthony Rockwell, Pickerington, OH (US); Jeffrey Tilton, Verona, KY (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 648 days.

(21) Appl. No.: 16/708,968

(22) Filed: Dec. 10, 2019

(65) Prior Publication Data

US 2020/0187747 A1     Jun. 18, 2020

Related U.S. Application Data (60) Provisional application No. 62/778,484, filed on Dec. 12, 2018.

(51) Int. Cl.
| | |
|---|---|
| *A47L 15/42* | (2006.01) |
| *B32B 5/24* | (2006.01) |
| *B32B 7/12* | (2006.01) |

(52) U.S. Cl.
CPC ............ *A47L 15/4209* (2016.11); *B32B 5/24* (2013.01); *B32B 7/12* (2013.01); *B32B 2262/101* (2013.01); *B32B 2307/102* (2013.01); *B32B 2307/304* (2013.01); *B32B 2509/00* (2013.01)

(58) Field of Classification Search
None
See application file for complete search history.

(56) References Cited

U.S. PATENT DOCUMENTS

| | | |
|---|---|---|
| 676,183 A | 6/1901 | Ferres |
| 1,855,161 A | 4/1932 | Wyman |
| 1,925,453 A | 9/1933 | Mazer |
| 2,018,800 A | 10/1935 | Morton |
| 2,128,296 A | 8/1938 | Goodwin et al. |
| 2,132,642 A | 10/1938 | Parsons |
| 2,192,516 A | 3/1940 | Cunnington |
| 2,405,527 A | 8/1946 | Skolnik |
| 2,413,331 A | 12/1946 | Munters |
| 4,093,482 A | 6/1978 | Ogata et al. |
| 4,107,373 A | 8/1978 | Miller |
| 4,184,905 A | 1/1980 | Ogata et al. |
| 4,301,890 A | 11/1981 | Zalas |
| 4,401,706 A | 8/1983 | Sovilla |
| 4,522,284 A | 6/1985 | Fearon et al. |
| 4,557,961 A | 12/1985 | Gorges |
| 4,630,416 A | 12/1986 | Lapins et al. |

(Continued)

FOREIGN PATENT DOCUMENTS

| | | |
|---|---|---|
| EP | 141355 B1 | 6/1988 |
| EP | 155834 B1 | 7/1992 |

(Continued)

*Primary Examiner* — Levon J Shahinian
(74) *Attorney, Agent, or Firm* — Calfee, Halter & Griswold LLP (57) ABSTRACT

An appliance is provided. The appliance includes a cellulose-based insulator. The cellulose-based insulator has a basis weight of 80 g/m² to 500 g/m² and an airflow resistance of 500 mks rayls to 2,500 mks rayls. The cellulose-based insulator attenuates low frequency noise and exhibits excellent fire resistance.

22 Claims, 7 Drawing Sheets

(56) References Cited

U.S. PATENT DOCUMENTS

| | | | |
|---|---|---|---|
| 4,720,414 A | 1/1988 | Burga | |
| 4,748,066 A | 5/1988 | Kelly et al. | |
| 4,987,022 A | 1/1991 | Ueno | |
| 5,057,176 A | 10/1991 | Bainbridge | |
| 5,215,073 A | 6/1993 | Wilson | |
| 5,670,238 A | 9/1997 | Earl et al. | |
| 6,220,388 B1 | 4/2001 | Sanborn | |
| 6,641,649 B2 | 11/2003 | John et al. | |
| 6,673,415 B1 | 1/2004 | Yamazaki et al. | |
| 7,618,907 B2 | 11/2009 | Tilton | |
| 7,815,993 B2 | 10/2010 | Hendren et al. | |
| 7,993,724 B2 | 8/2011 | Chacko et al. | |
| 8,251,175 B1 | 8/2012 | Englert et al. | |
| 8,387,747 B2 | 3/2013 | Koike et al. | |
| 8,402,961 B2 | 3/2013 | Choudhary et al. | |
| 8,815,113 B2 | 8/2014 | Kostova | |
| 9,027,706 B2 | 5/2015 | Staudt | |
| 2002/0108349 A1 | 8/2002 | Liu | |
| 2010/0024851 A1 | 2/2010 | Rockwell et al. | |
| 2012/0298154 A1* | 11/2012 | Rockwell ............ | A47L 15/4209 134/184 |
| 2013/0174435 A1 | 7/2013 | Rockwell et al. | |
| 2015/0075901 A1 | 3/2015 | Beresowski | |
| 2016/0159028 A1 | 6/2016 | Oleske | |

FOREIGN PATENT DOCUMENTS

| | | | |
|---|---|---|---|
| EP | 510927 | A2 | 10/1992 |
| EP | 447090 | B1 | 5/1995 |
| EP | 413376 | B1 | 6/1995 |
| EP | 1272322 | A1 | 1/2003 |
| EP | 1299234 | A1 | 4/2003 |
| EP | 941209 | B1 | 8/2003 |
| EP | 1062211 | B1 | 10/2003 |
| EP | 1485528 | A2 | 12/2004 |
| EP | 1523407 | A1 | 4/2005 |
| EP | 1526941 | A1 | 5/2005 |
| EP | 1610944 | A1 | 1/2006 |
| EP | 1615762 | A2 | 1/2006 |
| EP | 1633554 | A1 | 3/2006 |
| EP | 1711651 | A2 | 10/2006 |
| EP | 1768838 | A2 | 4/2007 |
| EP | 1846229 | A2 | 10/2007 |
| EP | 1931512 | A1 | 6/2008 |
| EP | 1945445 | A1 | 7/2008 |
| EP | 1957931 | A1 | 8/2008 |
| EP | 2035632 | A2 | 3/2009 |
| EP | 2082095 | A2 | 7/2009 |
| EP | 2089203 | A2 | 8/2009 |
| EP | 1732753 | B1 | 1/2010 |
| EP | 1468043 | B1 | 6/2010 |
| EP | 2242726 | A1 | 10/2010 |
| EP | 1815053 | B1 | 12/2010 |
| EP | 2379785 | A1 | 10/2011 |
| EP | 2467516 | A2 | 6/2012 |
| EP | 2488683 | A1 | 8/2012 |
| EP | 2743299 | A1 | 6/2014 |
| EP | 2747994 | A1 | 7/2014 |
| EP | 2231912 | B1 | 10/2014 |
| EP | 2561127 | B1 | 1/2015 |
| EP | 2561128 | B1 | 1/2015 |
| EP | 2875950 | A1 | 5/2015 |
| EP | 2878723 | A2 | 6/2015 |
| EP | 2892717 | A1 | 7/2015 |
| EP | 2069706 | B1 | 12/2015 |
| EP | 2235245 | B1 | 12/2015 |
| EP | 2968033 | A1 | 1/2016 |
| EP | 3033449 | A1 | 6/2016 |
| EP | 3052689 | A1 | 8/2016 |
| EP | 3086317 | A1 | 10/2016 |
| EP | 3116372 | A1 | 1/2017 |
| EP | 3126135 | A1 | 2/2017 |
| EP | 2650118 | B1 | 9/2017 |
| EP | 2611605 | B1 | 12/2017 |
| WO | 1991010023 | A1 | 7/1991 |
| WO | 1999011702 | A1 | 3/1999 |
| WO | 2000006375 | A1 | 2/2000 |
| WO | 2000063011 | A1 | 10/2000 |
| WO | 2002004730 | A1 | 1/2002 |
| WO | 2004052641 | A1 | 6/2004 |
| WO | 2005010260 | A2 | 2/2005 |
| WO | 2005021884 | A1 | 3/2005 |
| WO | 2005111289 | A1 | 11/2005 |
| WO | 2005120822 | A1 | 12/2005 |
| WO | 2006026755 | A2 | 3/2006 |
| WO | 2006028550 | A1 | 3/2006 |
| WO | 2006125083 | A2 | 11/2006 |
| WO | 2006137925 | A2 | 12/2006 |
| WO | 2008006395 | A1 | 1/2008 |
| WO | 2008019412 | A2 | 2/2008 |
| WO | 2010144798 | A2 | 12/2010 |
| WO | 2012006300 | A1 | 1/2012 |
| WO | 2012161695 | A1 | 11/2012 |
| WO | 2013052723 | A2 | 4/2013 |
| WO | 2013073652 | A1 | 5/2013 |
| WO | 2013124069 | A2 | 8/2013 |
| WO | 2014173908 | A1 | 10/2014 |
| WO | 2015002693 | A2 | 1/2015 |
| WO | 2015013825 | A1 | 2/2015 |
| WO | 2016042556 | A1 | 3/2016 |
| WO | 2016187572 | A1 | 11/2016 |
| WO | 2016205091 | A1 | 12/2016 |
| WO | 2017079501 | A1 | 5/2017 |
| WO | 2017081672 | A1 | 5/2017 |
| WO | 2017084721 | A1 | 5/2017 |
| WO | 2018009055 | A1 | 1/2018 |

* cited by examiner

APPLIANCE WITH CELLULOSE-BASED INSULATOR

CROSS-REFERENCE TO RELATED APPLICATIONS

This application claims priority to and the benefit of U.S. Provisional Application No. 62/778,484, filed Dec. 12, 2018, the entire content of which is incorporated by reference herein.

FIELD

The general inventive concepts relate to appliances and, more particularly, to an appliance that includes a cellulose-based insulator. The cellulose-based insulator attenuates low frequency noise and exhibits excellent fire resistance.

BACKGROUND

In a typical appliance, the noise frequencies that generally cause the appliance to sound loud are in the range of 100 hertz to 1,000 hertz (i.e., low frequency noise). To reduce the effect of these frequencies, sound attenuating insulation is placed into the appliance in strategic areas to attenuate as much noise as possible. However, low frequency noise has a long wavelength, which generally requires a very thick/heavy insulation to reduce the noise level. Due to size constraints, the thickness of insulation needed to meaningfully reduce the noise level is usually not an option.

Lightweight polymer facings, such as those described in U.S. Pat. No. 7,618,907, have been used to assist in attenuating noise in appliances. Such facings may have a basis weight of about 32 g/m$^2$ and an airflow resistance of about 1,000 mks rayls. While such a facing material is somewhat effective for attenuating certain frequencies of noise, due to manufacturing constraints, heavier versions of this facing material cannot be manufactured easily or cost-effectively. Furthermore, even if heavier versions of the polymer facing material could be manufactured easily and in a cost-effective manner, such heavier versions of the polymer facing material often times will not pass all of the flammability standards (e.g., UL94 V-0, UL94 HB, UL94-5VA) that may be required for incorporation into a particular appliance.

SUMMARY

The general inventive concepts relate to appliances that include a cellulose-based insulator that attenuates low frequency noise and exhibits excellent fire resistance. To illustrate various aspects of the general inventive concepts, several exemplary embodiments of appliances including a cellulose-based insulator are disclosed.

In one exemplary embodiment, an acoustically insulated appliance is provided. The acoustically insulated appliance includes an appliance having an internal source of noise and a cellulose-based insulator having a basis weight of 80 g/m$^2$ to 540 g/m$^2$ and an airflow resistance of 500 mks rayls to 2,500 mks rayls. A side of the cellulose-based insulator having the largest surface area is positioned in the appliance to face toward the internal source of noise.

In one exemplary embodiment, a thermally insulated appliance is provided. The thermally insulated appliance includes an appliance having a housing and an internal source of heat positioned within the housing, and a cellulose-based insulator having a basis weight of 80 g/m$^2$ to 540 g/m$^2$ and an airflow resistance of 500 mks rayls to 2,500 mks rayls. The cellulose-based insulator insulates at least a portion of the housing.

In one exemplary embodiment, an acoustically and thermally insulated appliance is provided. The thermally insulated appliance includes an appliance having a housing, an internal source of noise, an internal source of heat positioned within the housing, and a cellulose-based insulator having a basis weight of 80 g/m$^2$ to 540 g/m$^2$ and an airflow resistance of 500 mks rayls to 2,500 mks rayls. A side of the cellulose-based insulator having the largest surface area is positioned in the appliance to face toward the internal source of noise, and the cellulose-based insulator insulates at least a portion of the housing.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The present application discloses exemplary embodiments of appliances having a cellulose-based insulator. The cellulose-based insulator attenuates low frequency noise and also exhibits excellent fire resistance.

Figure 1:
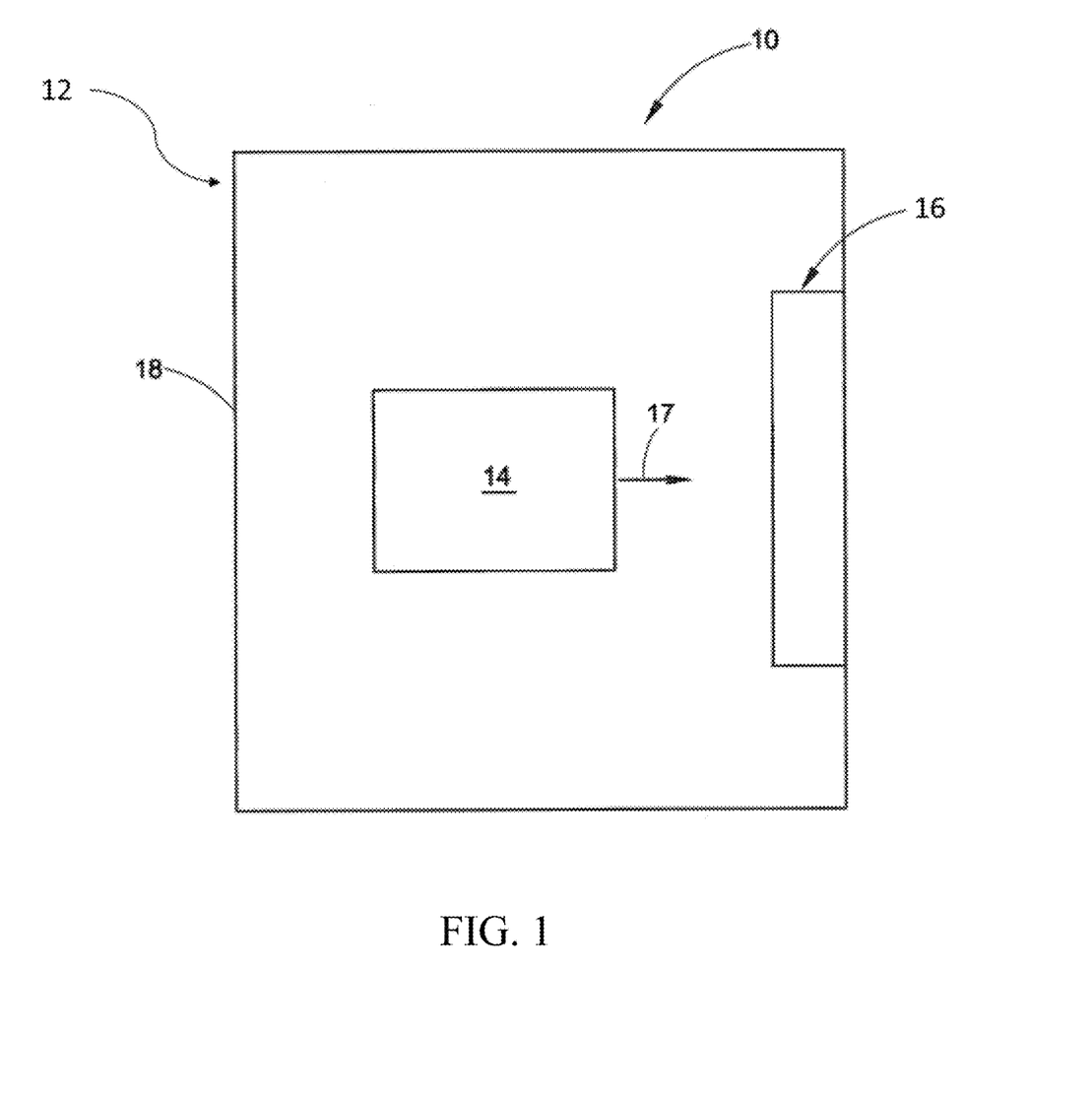
FIG. 1 is a schematic illustration of an exemplary embodiment of an acoustically insulated appliance.

In one exemplary embodiment, an acoustically insulated appliance 10 is provided. Referring to FIG. 1, the acoustically insulated appliance 10 includes an appliance 12 having an internal source of noise 14 and a cellulose-based insulator 16 (also referred to herein as "insulator") having a basis weight of 80 g/m$^2$ to 540 g/m$^2$ and an airflow resistance of 500 mks rayls to 2,500 mks rayls. A side of the insulator 16 having the largest surface area is positioned in the appliance 12 to face toward the internal source of noise 14 to absorb (and partially reflect) sound energy 17 generated by the internal source of noise 14 to make the appliance 12 quieter during operation. In the example illustrated in FIG. 1, the appliance 12 includes a housing 18 and the insulator 16 is positioned inside of the housing 18. However, it is contemplated that the insulator 16 may be positioned outside of the housing 18, or both inside of and outside of the housing 18. The insulator 16 is particularly effective for attenuating low frequency noise (i.e., noise having a frequency of 100 hertz to 1,000 hertz) generated by conventional household appliances.

In accordance with the present disclosure, the cellulose-based insulator 16 has a basis weight of 80 $g/m^2$ to 540 $g/m^2$ and an airflow resistance of 500 mks rayls to 2,500 mks rayls. The insulator 16 may have a thickness of 0.25 mm to 2 mm, including a thickness of 0.5 mm to 1.5 mm, 0.5 mm to 1.25 mm, 0.65 mm to 1 mm, and also including from 0.7 mm to 0.95 mm. The insulator 16 comprises cellulose fibers and a flame retardant, and can be made using conventional papermaking equipment and techniques, such as a wet laid technique.

In general, the cellulose fibers comprising the insulator 16 are derived from a pulp. The pulp used to create the insulator 16 may include various sources of cellulose fiber. Suitable sources of cellulose fiber include, but are not limited to, northern hardwood, northern softwood, southern hardwood, southern softwood, and nonwood sources (e.g., cotton, jute, kenaf, flax). In embodiments of the present disclosure, the insulator 16 comprises cellulose fibers derived from a blend of southern bleached softwood kraft pulp, bleached second-cut cotton linters pulp, and mercerized southern bleached softwood kraft pulp. In some embodiments of the present disclosure, cellulose fibers comprise from 70 wt % to 85 wt % of the insulator 16. In some embodiments of the present disclosure, cellulose fibers comprise from 75 wt % to 80 wt % of the insulator 16.

The insulator 16 of the present disclosure also includes a flame retardant. A variety of flame retardants may be used to improve the flammability rating of the insulator 16. Suitable flame retardants for use in the insulator 16 include, but are not limited to, melamine pyrophosphate, melamine polyphosphate, aluminum diethylphosphinate, monoammonium phosphate, diammonium phosphate, ammonium polyphosphate, ammonium sulfate, ammonium borate, borax, boric acid salts, ammonium sulfamate, sulfamic acid salts, aluminum sulfate, sodium silicates, and guanyl urea phosphate. In some embodiments of the present disclosure, the flame retardant comprises from 15 wt % to 25 wt % of the insulator 16. In some embodiments of the present disclosure, the flame retardant comprises from 18 wt % to 22 wt % of the insulator 16. In some embodiments of the present disclosure, the insulator 16 comprises melamine pyrophosphate as a flame retardant.

The insulator 16 of the present disclosure exhibits excellent fire resistance. In embodiments of the present disclosure, the insulator 16 has a flammability rating of at least UL94 V-0. The UL94 V-0 flammability rating is set by Underwriters Laboratories (UL) (Northbrook, Ill.) based on a vertical burn test that evaluates both the burning and afterglow times and dripping of a burning test specimen. In embodiments of the present disclosure, the insulator 16 has a flammability rating of UL94 V-0, UL94 HB, and UL94-5VA. The UL94 HB and the UL94-5VA flammability ratings are also set by UL. The UL94 HB flammability rating is based on a horizontal burn test that evaluates the burning rate of a test specimen taking into account the thickness of the test specimen. The UL94-5VA flammability rating is based on a vertical burn test that evaluates both the flammability of the test specimen and any holes that are formed in sheets of the specimen.

Figure 2:
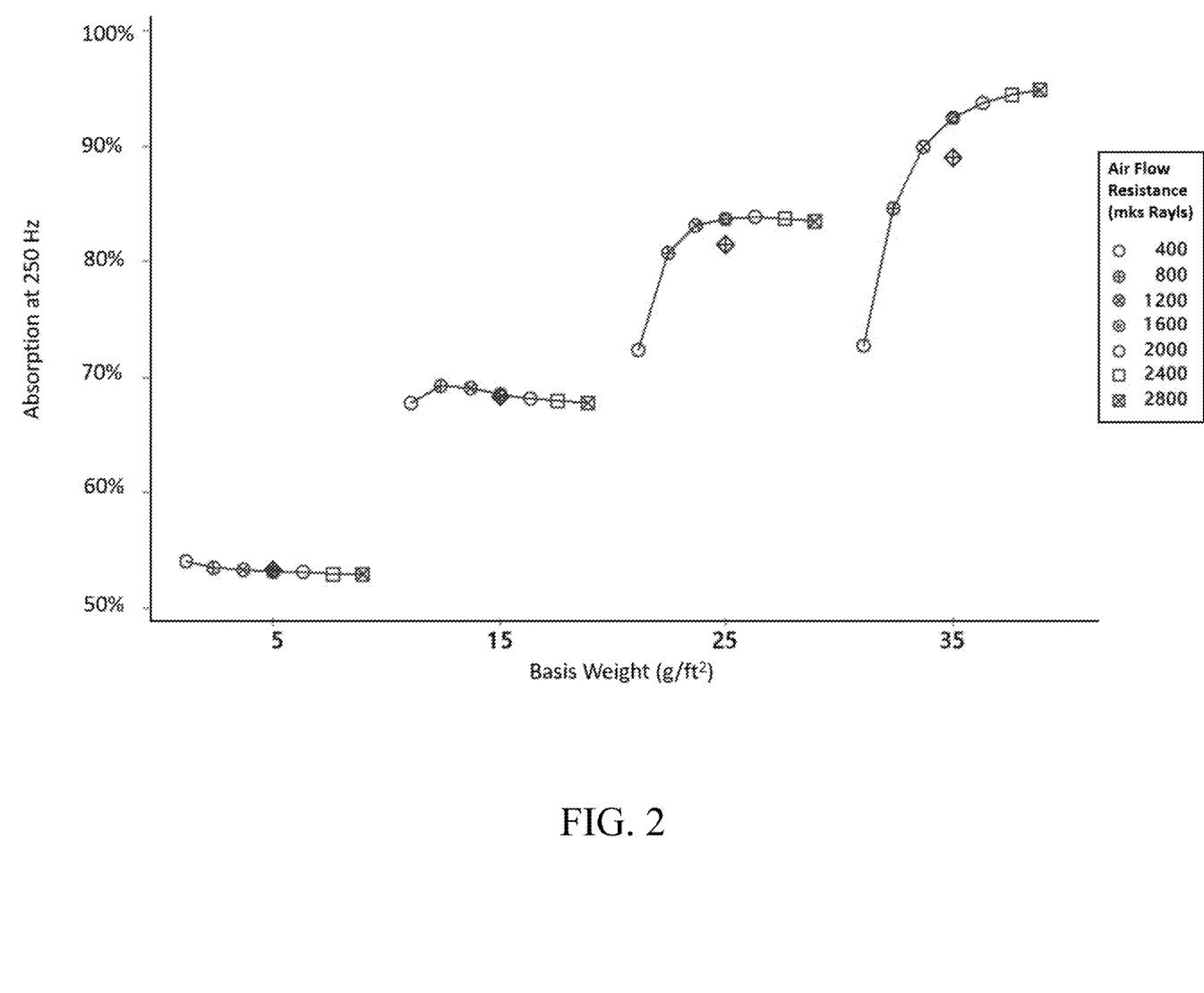
FIG. 2 is a graph showing the effect of basis weight and airflow resistance on low frequency noise absorption.

As mentioned above, the insulator 16 of the present disclosure has a basis weight of 80 $g/m^2$ to 540 $g/m^2$ and an airflow resistance of 500 mks rayls to 2,500 mks rayls. While both of these parameters are important for noise absorption purposes, it has been found that these parameters work in a synergistic way to maximize low frequency noise absorption. FIG. 2 illustrates the effect of basis weight and airflow resistance of an exemplary embodiment of the insulator 16 of the present disclosure with respect to its ability to absorb noise at a frequency of 250 hertz. As seen in FIG. 2, increasing the basis weight from 5 $g/ft^2$ (53.8 $g/m^2$) to 35 $g/ft^2$ (376.7 $g/m^2$) increases the percent absorption of noise at 250 hertz from about 53% at 5 $g/ft^2$ (53.8 $g/m^2$) to about 90% at 35 $g/ft^2$ (376.7 $g/m^2$). As also seen in FIG. 2, increasing the air flow resistance of the insulator 16 at low basis weights (e.g., at 5 $g/ft^2$) has little, if any, effect on the percentage of noise absorption, whereas increasing the air flow resistance of the insulator 16 from 400 mks rayls to 2,400 mks rayls at higher basis weights (e.g., at 25 $g/ft^2$ or 35 $g/ft^2$) can increase the percentage of noise absorption by 10%, 15%, 20%, 25%, or more. The synergy exhibited by the basis weight and the air flow resistance of the insulator 16 for attenuating low frequency noise provides the ability to fine tune the insulator 16 to attenuate low frequency noise in various appliances.

In various exemplary embodiments, the insulator 16 of the present disclosure has a basis weight of 80 $g/m^2$ to 540 $g/m^2$ and an airflow resistance of 500 mks rayls to 2,500 mks rayls, including a basis weight of 100 $g/m^2$ to 500 $g/m^2$ and an airflow resistance of 600 mks rayls to 2,400 mks rayls, a basis weight of 125 $g/m^2$ to 450 $g/m^2$ and an airflow resistance of 600 mks rayls to 2,000 mks rayls, a basis weight of 150 $g/m^2$ to 400 $g/m^2$ and an airflow resistance of 700 mks rayls to 1,800 mks rayls, and also including a basis weight of 175 $g/m^2$ to 325 $g/m^2$ and an airflow resistance of 1,000 mks rayls to 1,800 mks rayls. In certain exemplary embodiment, the insulator 16 has a basis weight of 90 $g/m^2$ to 115 $g/m^2$ and an airflow resistance of 600 mks rayls to 800 mks rayls. In certain exemplary embodiments, the insulator 16 has a basis weight of 200 $g/m^2$ to 250 $g/m^2$ and an airflow resistance of 850 mks rayls to 1,150 mks rayls. In certain exemplary embodiments, the insulator 16 has a basis weight of 150 $g/m^2$ to 225 $g/m^2$ and an airflow resistance of 1,000 mks rayls to 1,500 mks rayls.

Figure 3:
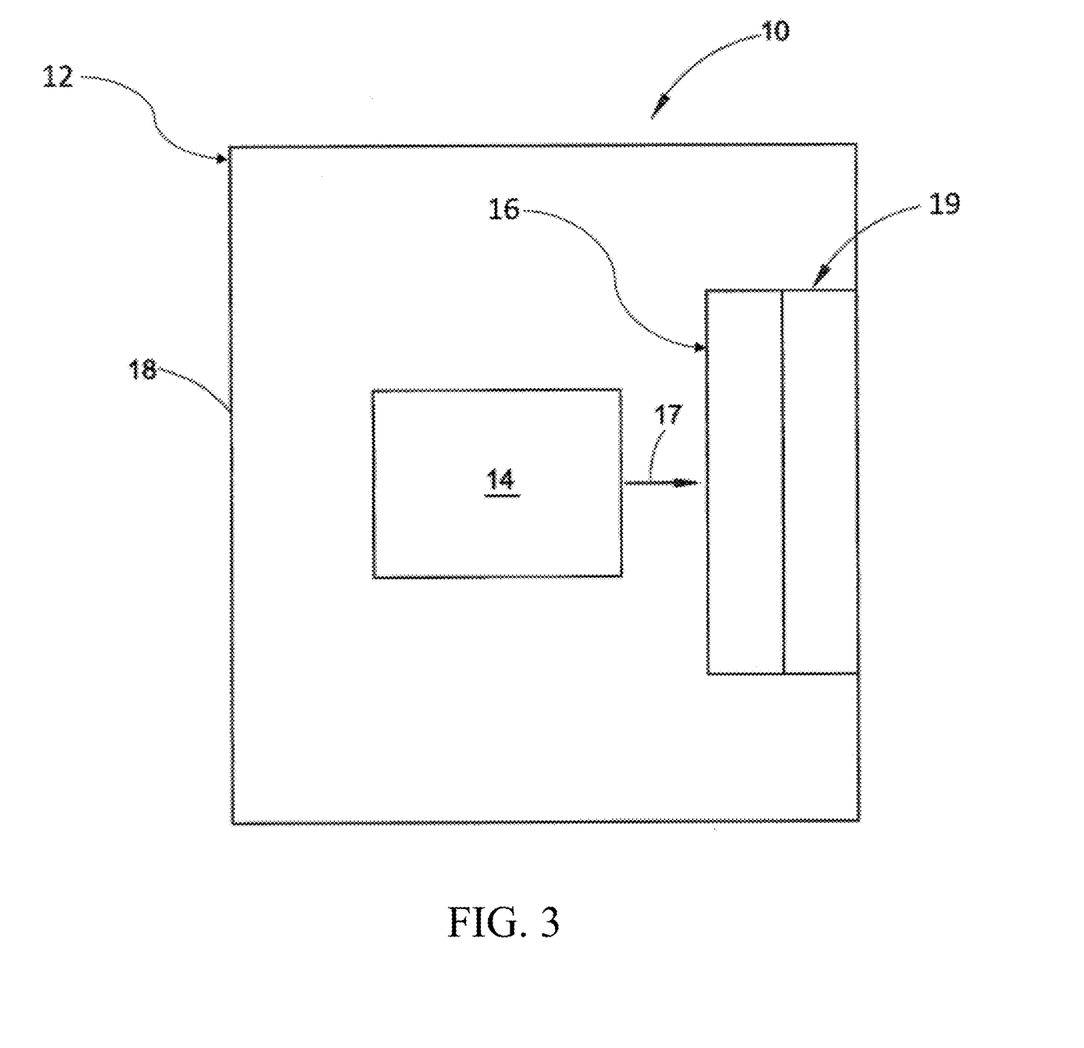
FIG. 3 is a schematic illustration of an exemplary embodiment of an acoustically insulated appliance.

In some embodiments, the acoustically insulated appliance 10 further comprises an insulation member 19. As seen in FIG. 3, the acoustically insulated appliance 10 includes an appliance 12 having an internal source of noise 14 and an insulator 16. The insulator 16 is attached to the insulation member 19 and a major face of the insulator 16 is positioned to face toward the internal source of noise to absorb (and partially reflect) sound energy 17 generated by the internal source of noise 14. The insulator 16 may be attached to the insulation member 19 in a variety of ways including, but not limited to, by an adhesive. In the example illustrated in FIG. 3, the appliance 12 includes a housing 18 and the insulator 16 and insulation member 19 are positioned inside of the housing 18. However, it is contemplated that the insulator 16 and insulation member 19 may be positioned outside of the housing 18, or both inside of and outside of the housing 18. As previously mentioned, the insulator 16 is effective for attenuating low frequency noise (i.e., noise having a frequency of 100 hertz to 1,000 hertz) generated by conventional household appliances. On the other hand, the insulation member 19 may be useful for attenuating noise at higher frequencies (e.g., greater than 1,000 hertz). Accordingly, the combination of the insulator 16 and the insulation member 19 can attenuate low frequency noise and higher frequency noise generated during the operation of conventional household appliances.

The insulation member 19 may comprise a variety of materials and take a variety of forms. In some embodiments, the insulation member 19 is selected from a high-loft polyester batt, a fibrous polymer mat, a fiberglass batt, a mineral wool batt, and a natural fiber batt. The term "high-loft" refers to a density of less than 2.7 lb/ft$^3$ (0.043 g/cm$^3$).

In certain embodiments, the insulation member 19 comprises a high-loft polyester batt having a density of 0.25 lb/ft$^3$ to 2.7 lb/ft$^3$ (0.004 g/cm$^3$ to 0.043 g/cm$^3$) and a thickness of 0.25 inch to 2 inches (0.64 cm to 5.08 cm). In some embodiments, the insulation member 19 comprises one or more layers of the high-loft polyester batt, wherein each layer has a density of 0.25 lb/ft$^3$ to 2.7 lb/ft$^3$ (0.004 g/cm$^3$ to 0.043 g/cm$^3$) and a thickness of 0.25 inch to 2 inches (0.64 cm to 5.08 cm), and the insulator 16 is attached to portions of the high-loft polyester batt that would otherwise directly face the internal source of noise 14.

In certain embodiments, the insulation member 19 comprises a high-loft polyester batt having a density of 0.25 lb/ft$^3$ to 1 lb/ft$^3$ (0.004 g/cm$^3$ to 0.016 g/cm$^3$) and a thickness of 0.25 inch to 2 inches (0.64 cm to 5.08 cm). In some embodiments, the insulation member 19 comprises one or more layers of the high-loft polyester batt, wherein each layer has a density of 0.25 lb/ft$^3$ to 1 lb/ft$^3$ (0.004 g/cm$^3$ to 0.016 g/cm$^3$) and a thickness of 0.25 inch to 2 inches (0.64 cm to 5.08 cm), and the insulator 16 is attached to portions of the high-loft polyester batt that would otherwise directly face the internal source of noise 14.

In some embodiments, the insulation member 19 comprises a high-loft polyester batt having a density of 0.35 lb/ft$^3$ to 0.60 lb/ft$^3$ (0.0056 g/cm$^3$ to 0.0096 g/cm$^3$) and a thickness of 0.25 inch to 2 inches (0.64 cm to 2.54 cm). In some embodiments, the insulation member 19 comprises one or more layers of the high-loft polyester batt, wherein each layer has a density of 0.35 lb/ft$^3$ to 0.60 lb/ft$^3$ (0.0056 g/cm$^3$ to 0.0096 g/cm$^3$) and a thickness of 0.25 inch to 2 inches (0.64 cm to 5.08 cm), and the insulator 16 is attached to portions of the high-loft polyester batt that would otherwise directly face the internal source of noise 14.

In some embodiments of the present disclosure, the insulation member 19 comprises a fibrous polymer mat. One example of a suitable fibrous polymer mat is described in U.S. Pat. No. 7,618,907, which is incorporated by reference herein in its entirety. The fibrous polymer mat according to U.S. Pat. No. 7,618,907 includes: a first fibrous layer selected from a group of fibers consisting of polyester, polypropylene, polyethylene, fiberglass, natural fibers, nylon, rayon and blends thereof, wherein said fibers have an average diameter of 10 microns to 30 microns and a thickness of 0.5 cm to 8 cm; and a layer of meltblown polypropylene fibers having a thickness of 0.0127 cm to 0.254 cm, wherein the first fibrous layer and the layer of meltblown polypropylene fibers are bonded together by means of heat, spray adhesive, or both.

In some embodiments of the present disclosure, the insulation member 19 comprises a fiberglass batt. The fiberglass batt may be a conventional, commercially available fiberglass batt. The fiberglass batt may have a density of 10 kg/m$^3$ to 100 kg/m$^3$ and may have a thickness of 1.27 cm to 7.62 cm.

In some embodiments of the present disclosure, the insulation member 19 comprises a mineral wool batt. The mineral wool batt may be a conventional, commercially available mineral wool batt. The mineral wool batt may have a density of 30 kg/m$^3$ to 100 kg/m$^3$ and may have a thickness of 1.27 cm to 7.62 cm.

In some embodiments of the present disclosure, the insulation member 19 comprises a natural fiber batt. The natural fiber batt may be a conventional, commercially available natural fiber batt. The natural fiber batt may comprise a variety of natural fiber materials including, but not limited to, hemp, kenaf, and cotton. The natural fiber batt may have a density of 5 kg/m$^3$ to 100 kg/m$^3$ and may have a thickness of 1.27 cm to 7.62 cm.

Figure 4:
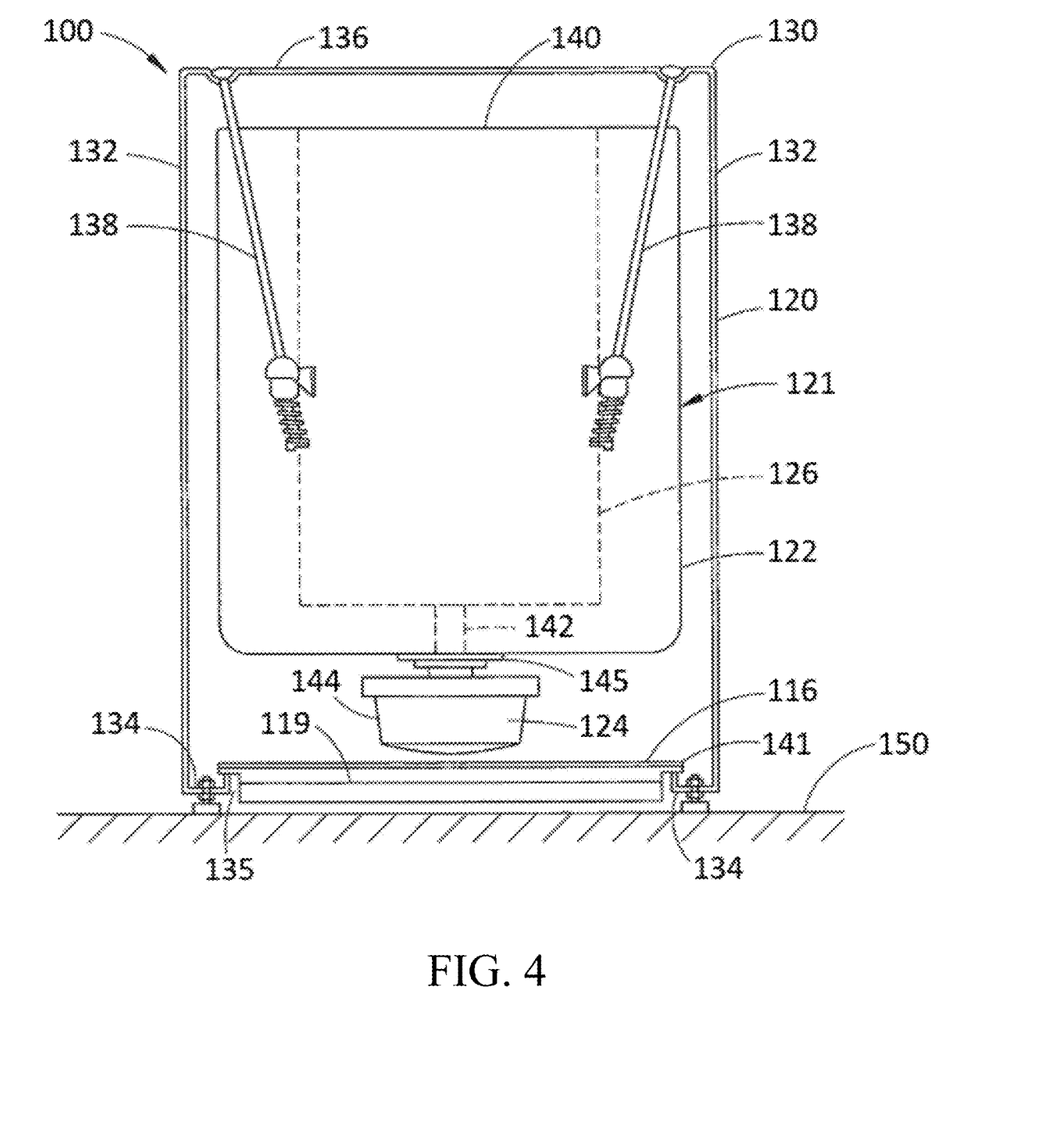
FIG. 4 is a diagram of an exemplary embodiment of an acoustically insulated clothes washer.

The acoustically insulated appliance 10 of the present disclosure may take a variety of forms. For example, the acoustically insulated appliance 10 may be a clothes washing machine, a dishwasher, an air conditioner, a microwave oven, a refrigerator, a freezer, or any other household appliance that makes discernable noise. FIG. 4 illustrates an exemplary embodiment of an acoustically insulated clothes washing machine 100. The clothes washing machine 100 may be any type of clothes washing machine, including top loading and front-loading washing machines. The non-limiting example illustrated by FIG. 4 is a top loading washing machine. The term "top loading", as used herein, is defined to mean that an internal basket configured to retain laundry items during the washing cycle is oriented in an upright position and that the laundry items enter the basket from a top opening in the washing machine 100. However, the concepts of the acoustically insulated washing machine 100 can be applied to any type of washing machine.

The illustrated washing machine 100 includes a cabinet 120 (or housing), a washing assembly 121, a motor assembly 124 and a cellulose-based insulator 116. As shown in FIG. 4, the cabinet 120 is configured to provide an enclosure for the internal components of the washing machine 100. The illustrated cabinet 120 includes a top surface 130, side surfaces 132 and bottom frame flanges 134 that surround a bottom opening 135. However, the cabinet 120 can take a variety of different forms. The cabinet 120 can be made from sheet metal and covered with a finish such as an enamel-based finish. The cabinet can be made from a variety of different materials and/or combinations of materials. Examples of suitable materials for the cabinet include, but are not limited to plastic, fiberglass reinforced plastic, any type of sheet metal, and so forth. The cabinet 120 may have any finish. The cabinet 120 can be made from stainless steel sheet metal, and can have other desired finishes, such as for example a clear lacquer finish. The top surface 130 of the cabinet includes an opening 136 for accepting clothes. In the embodiment where the washing machine is a front loading washing machine, the opening 136 would be provided on a front wall of the cabinet 120.

Referring again to FIG. 4, the illustrated washing assembly 121 includes a tub 122 and a basket 126. Because the illustrated washing machine 100 is a top loading machine, the tub and basket 122, 126 are vertically oriented. In a front loading washing machine, the tub and basket will be oriented and configured differently. It should be appreciated that the top loading machine is described only to provide an example and the insulator 116 can be used with any type of clothes washing machine.

In the embodiment illustrated by FIG. 4, the tub 122 is suspended within the cabinet 120 and is configured to retain water used for washing laundry items. The tub 122 can take a variety of different forms and can be made from a variety of different materials. The tub 122 may be generally cylindrical with an open top 140 as shown, but may take a variety of shapes. The tub may be made from plastic/polymeric materials, or metals, such as steel stainless steel, and aluminum. Preferably, the tub 122 is made from a material that is resistant to corrosion when exposed to water or at least the inside surface of the tub is coated with a material that is resistant to corrosion when exposed to water.

As shown in the example of FIG. 4, the tub 122 is connected to ends of a plurality of suspension devices 138. The other ends of the suspension devices 138 being coupled to the cabinet 120. In the illustrated embodiment, the suspension devices 138 are coupled to the top surface 130 of the cabinet 120. The suspension devices 138 are configured to allow some vertical movement of the tub 122 with respect to the cabinet 120 while limiting rotational movement of the tub 122 with respect to the cabinet 120. However, the tub 122 may be coupled to the cabinet 120 in a variety of ways. In the illustrated embodiment, the suspension devices 138 are a combination of rods, springs, and attachment mechanisms. In other embodiments, the suspension devices 138 can be any desired structure, mechanism, or device sufficient to suspend the tub 122 within the cabinet 120. The suspension devices 138 may allow vertical movement of the tub 122 with respect to the cabinet 120 or otherwise couple the tub 122 to the cabinet 120.

Referring again to the example illustrated by FIG. 4, the motor assembly 124 is positioned below the tub 122. The illustrated motor assembly 124 is configured to rotate the basket 126 via shaft 142. However, the motor assembly 124 may take a variety of different forms and may be coupled to the basket 126 in many different ways. The illustrated motor assembly 124 includes an external rotor 144 connected to the shaft 142 with a stator of the motor being secured to the tub 122 by a connection 145. Alternatively, the motor assembly 124 may include an external stator that is secured to the tub 122 with the internal rotor connected to shaft 142. Any rotor/stator configuration and coupling to the basket 126 may be employed.

With continued reference to the example illustrated by FIG. 4, the basket 126 is positioned within the tub 122 and configured to retain laundry items during the washing cycle. The basket 126 can take a variety of different forms and can be made from a variety of different materials. The basket 126 may be generally cylindrical with an open top as shown, but may take a variety of shapes. The basket 126 may be made from plastic/polymeric materials, or metals, such as steel, stainless steel, and aluminum. Preferably, the basket 126 is made from a material that is resistant to corrosion when exposed to water or the tub is coated with a material that is resistant to corrosion when exposed to water.

In one exemplary embodiment, the insulator 116 is disposed in the bottom opening 135 of the cabinet 120. The insulator 116 may be retained in the bottom opening 135 without requiring any fasteners or adhesive. The insulator 116 may be sized and/or shaped in a variety of ways to facilitate retention in the bottom opening 135. In the illustrated embodiment, the insulator 116 includes a lip or step 141 that engages or rests on the bottom frame flanges 134 of the bottom opening 135. The insulator 116 may also be applied to one or more inner surfaces of the cabinet 120.

The insulator 116 is positioned between the motor 124 and a floor 150 that supports the cabinet 120 of the clothes washing machine 100. As such, the insulator 116 absorbs (and partially reflects) low frequency noise generated by the washing machine motor 124 and thereby inhibits low frequency noise generated by the washing machine motor 124 from exiting through the bottom opening 135. In some embodiments, the insulator 116 may be attached to one or more insulation members 119, as previously described, such as a high-loft polyester batt, a fibrous polymer mat, a fiberglass batt, a mineral wool batt, and/or a natural fiber batt.

Figure 5:
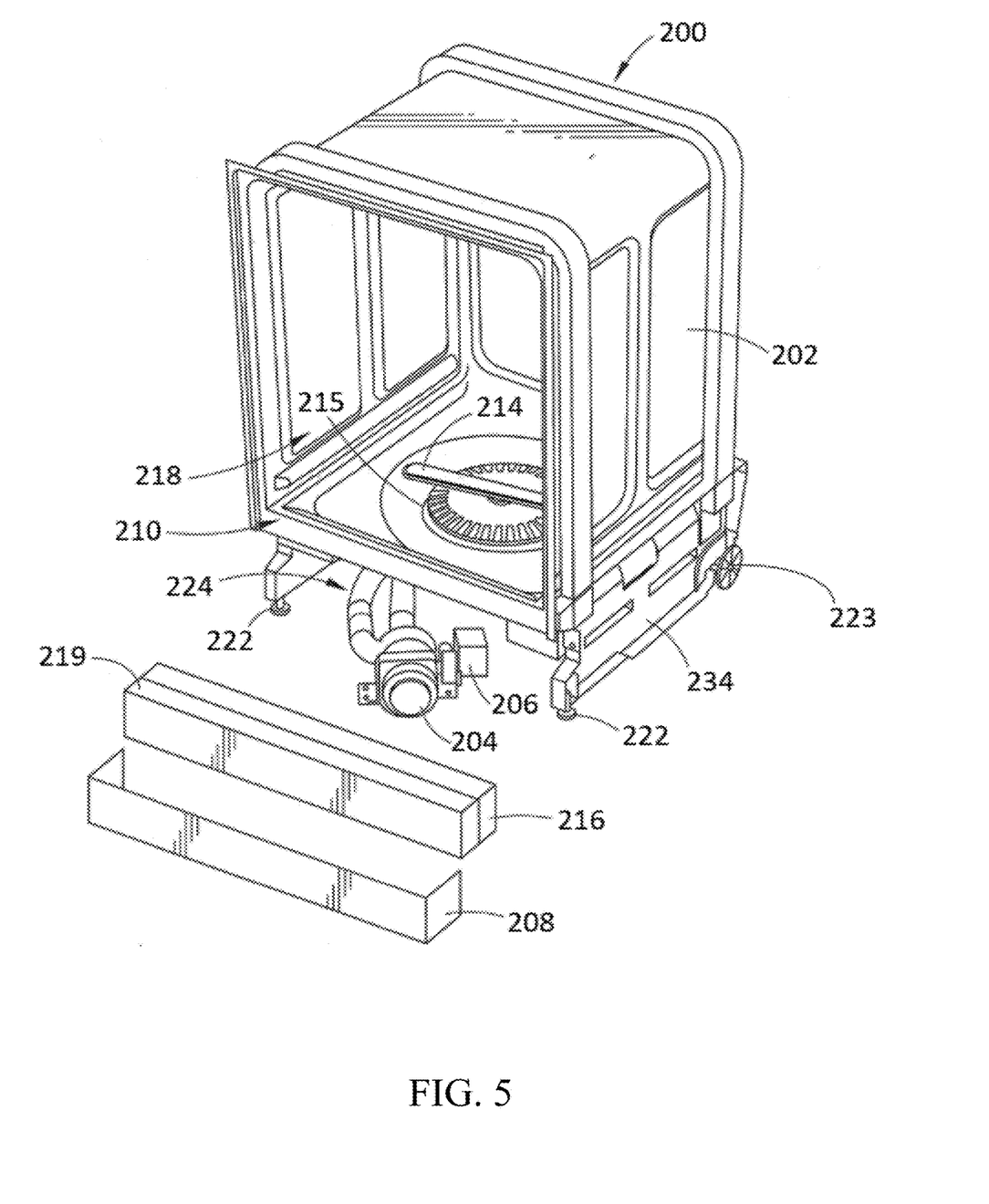
FIG. 5 is a perspective view of an exemplary embodiment of an acoustically insulated dishwasher.

Referring to FIG. 5, an exemplary embodiment of an acoustically insulated dishwasher 200 is illustrated. The acoustically insulated dishwasher 200 includes a housing 202, a pump 204, a drive motor 206, a kick plate 208 closing a front side 210 of the housing 202, and an insulator 216. The housing 202 includes a washing chamber 218 and an access door (not shown). A plurality of legs 222 or a combination of legs 222 and wheels 223 support the housing 202. The pump 204 and drive motor 206 are provided in a cavity 224 between the legs 222 and below the housing 202. The kick plate 208 closes a front side of the cavity 224. As seen in FIG. 5, the insulator 216 is disposed between the kick plate 208 and the pump 204 and drive motor 206.

In some embodiments, and as shown in FIG. 5, the insulator 216 may be attached to one or more insulation members 219, as previously described, such as a high-loft polyester batt, a fibrous polymer mat, a fiberglass batt, a mineral wool batt, and/or a natural fiber batt. The insulator 216 is oriented to face toward the pump 204 and motor 206 to absorb low frequency noise generated by the pump 204 and motor 206 during operation of the dishwasher 200. The insulation members 219 attenuate higher frequency noise generated by the pump 204 and motor 206. In certain embodiments, the insulator 216 (and insulation member 219, if present) may be attached to the outer surfaces of the housing 202 and/or within the access door of the housing 202.

The insulation member 216 may be used in a variety of dishwashers. The following description of a dishwasher is provided for illustrative purposes only and is not intended to limit the scope of the present disclosure unless otherwise stated. The dishwasher 200 illustrated by FIG. 5 includes a wash arm 214 that is arranged within washing chamber 218 above a sump 215. The wash arm 214 selectively delivers jets of washing fluid onto kitchenware placed within dishwasher 200 in a manner known in the art. The wash pump 204 is connected to the sump 215. In operation, the wash pump 204 creates a circulating flow of washing fluid within washing chamber 218 during a washing operation. The dishwasher 200 may have a plurality of control elements (not shown) for selecting particular operating parameters of a washing operation.

As shown in FIG. 5, the dishwasher 200 includes a base portion 234 that is provided with a pair of rear wheels, one of which is indicated at 223, that enables an installer to easily position dishwasher 200 in a desired location, and a pair of leveling legs 222 that enables the installer to accurately position/level the dishwasher 200. The dishwasher 200 may be arranged below a countertop adjacent to cabinetry.

In one exemplary embodiment, a thermally insulated appliance is provided. The thermally insulated appliance of the present disclosure includes an appliance having a housing and an internal source of heat positioned within the housing, and a cellulose-based insulator having a basis weight of 80 $g/m^2$ to 540 $g/m^2$ and an airflow resistance of 500 mks rayls to 2,500 mks rayls. The cellulose-based insulator insulates at least a portion of the housing. The thermally insulated appliance of the present disclosure may take a variety of forms. For example, the thermally insulated appliance may be an oven range, a clothes dryer, a hot water heater, or other household appliances that generate or experience high temperatures. The term "high temperature" used in the present disclosure refers to a temperature of 48° C. to 260° C.

Figure 6:
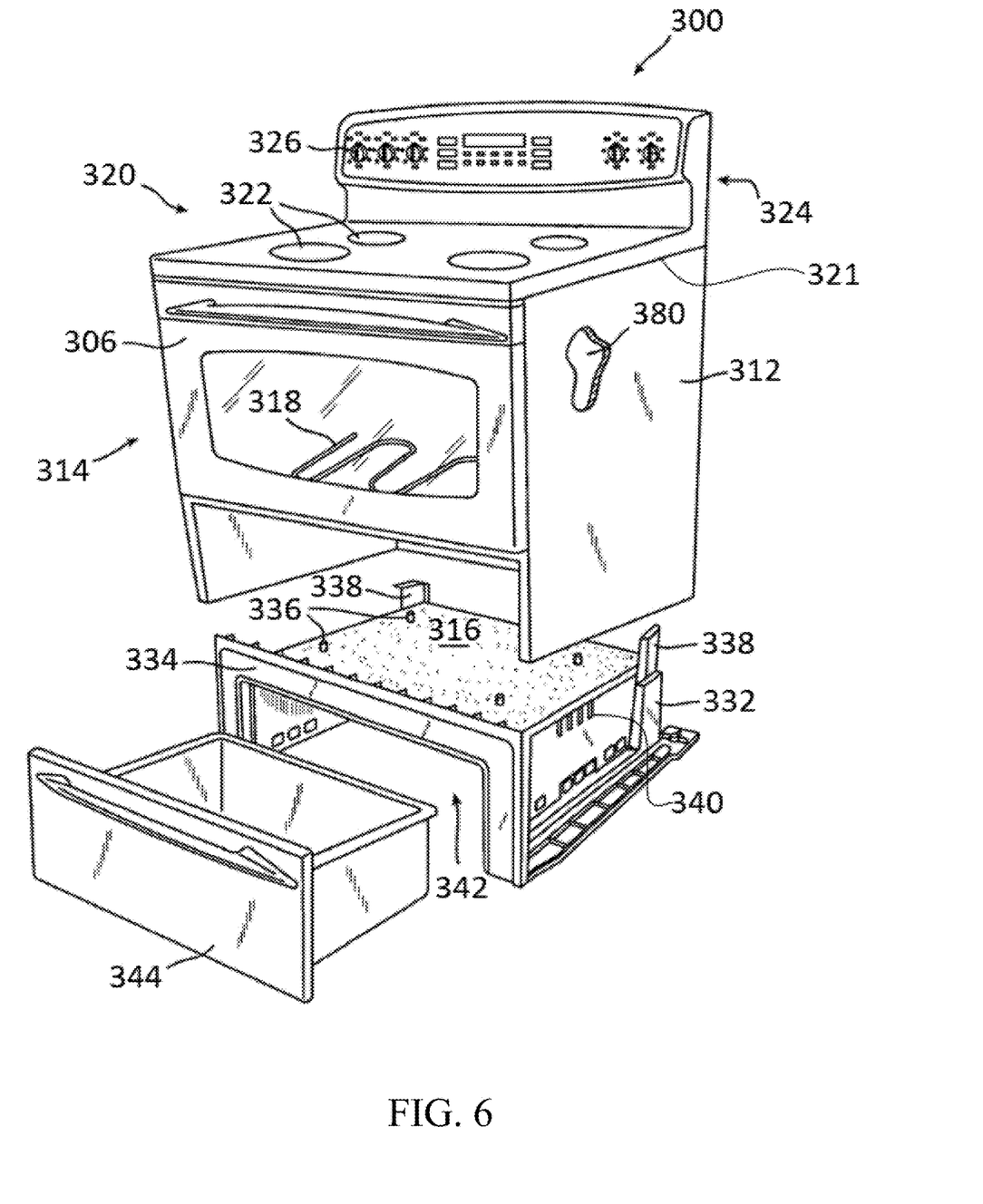
FIG. 6 is a partially exploded, perspective view of an oven range equipped with a cellulose-based insulator of the present disclosure.

FIG. 6 illustrates an exemplary embodiment of a thermally insulated appliance in the form of an oven range 300. The oven range 300 includes a housing 312 carrying an oven section 314 having a front access door 306 and a heating element 318, a range section 320 incorporating burners 322, and a control section 324 including the oven and burner control switches 326. An insulator 316 may be provided in the hollow wall 380 of the housing 312 and also provided between the oven range 300 and the underlying base support 332. As illustrated, the support 332 includes a series of molded in features such as a front face panel 334, insulation retention tabs 336, mounting brackets 338, and air circulation vents 340. The support 332 also includes a cavity 342 for receiving a sliding drawer 344.

In some embodiments, the housing 312 of the thermally insulated appliance may include mating metal surfaces 321, as seen in FIG. 6. In some embodiments, the insulator 316 may be positioned between the metal mating surfaces 321. As previously mentioned, the insulator 316 of the present disclosure exhibits excellent fire resistance and has a flammability rating of at least UL94 V-0. In some embodiments of the present disclosure, the insulator 316 has a flammability rating of UL94 V-0, UL94 HB, and UL94-5VA. Oven ranges often utilize stamped metal heat shields to direct airflow between an outer wall of the oven range and conventional insulation that may surround the oven section. The insulator 316 of the present disclosure may be used to replace the stamped metal heat shields based on its ability to withstand high temperatures and its minimal shrinkage (i.e., less than 10% shrinkage linearly, including from 0.5% to 10% shrinkage linearly). In addition, when the insulator 316 of the present disclosure is positioned between metal mating surfaces of a high temperature appliance, the insulator 316 serves as a thermal break, and can be used to replace more expensive conventional materials such as needled E-glass and ceramic-based paper.

Figure 7:
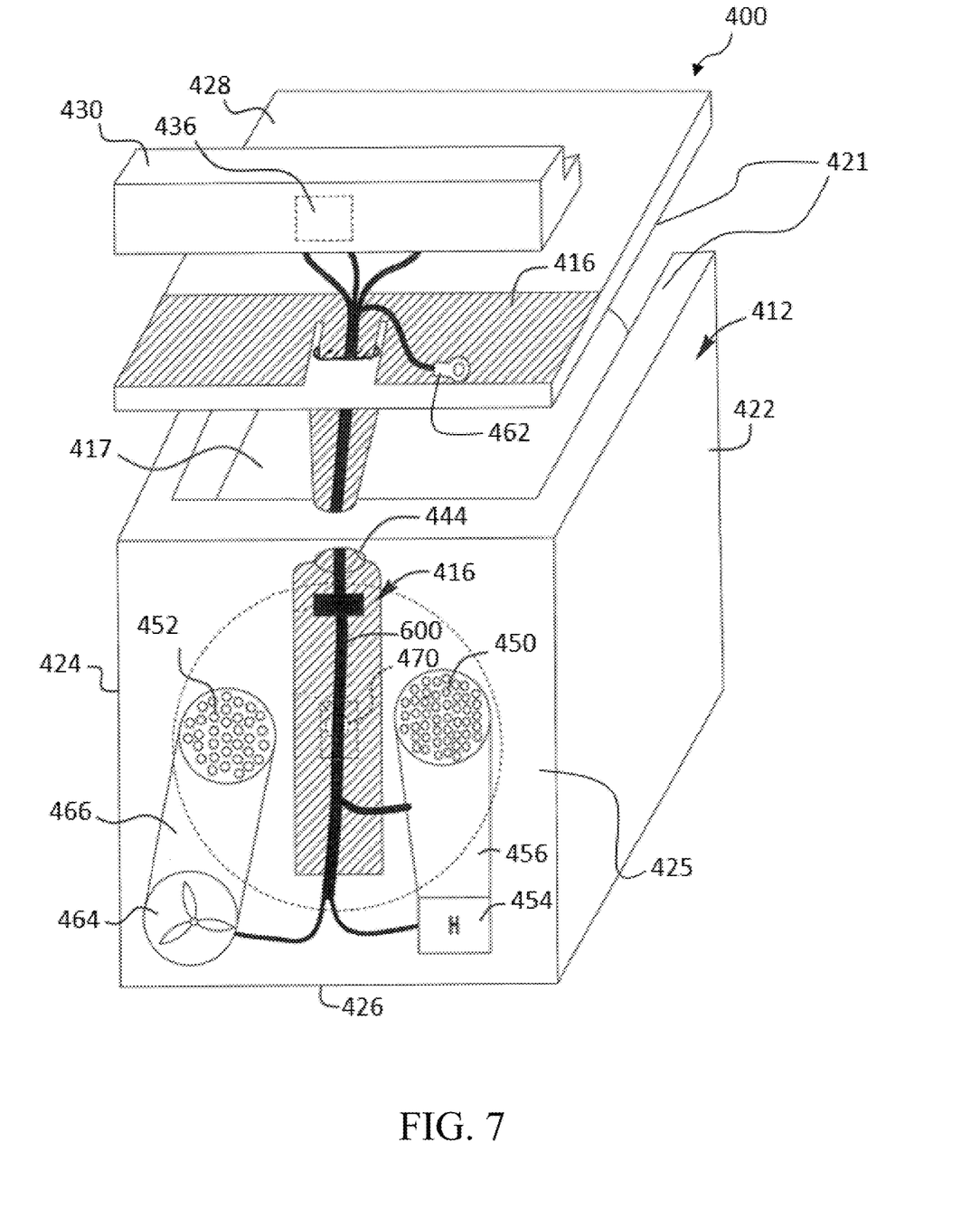
FIG. 7 is a partially exploded, rear perspective view of an exemplary embodiment of a clothes dryer that includes a cellulose-based insulator of the present disclosure.

FIG. 7 illustrates a partially exploded, rear perspective view of an exemplary embodiment of a thermally insulated appliance in the form of a clothes dryer 400. The clothes dryer 400 includes a housing 412 and a drum 417. The housing 412 can take a variety of forms. In the illustrated embodiment, the housing 412 includes a pair of side walls 422, 424, an optional bottom or floor 426, a top panel 428, a rear panel 425 (or rear bulkhead), and a front panel (or front bulkhead) (not shown) that may include an access door (not shown). The illustrated top panel 428 has a control panel or console 430 along a rear portion of the top panel 428. The control panel or console 430 may be integral with or formed separately from the top panel 428. The control panel or console 430 includes a plurality of controls that operate an electronic control unit 436 to select an automatic series of drying steps. The electronic control unit 436 may be housed in the rear portion of the top panel 428 or console 430. However, the electronic control unit 436 may be disposed at any location in the housing 412 and may comprise a single or multiple electronic control devices.

The clothes dryer 400 may include an inlet opening or vent 450 and/or an outlet opening or vent 452. The inlet opening or vent 450 is connected to a heater 454 by a duct 456. The heater 454 (heating element) provides heated air through the duct 456 and vent 450 into the drum 417. The outlet opening or vent 452 is connected to a blower 464 by a duct 466. The blower 464 draws heated air from the heater 454 into the drum 417, out the duct 466, and out the blower 464 to an exhaust duct (not shown). As such, the blower 464 draws heated air into the drum 417 and exhausts moisture laden air to be removed from the drum 417. Although illustrated in the rear of the clothes dryer 400, the inlet opening or vent 450 and/or the outlet opening or vent 452 may be provided at other locations of the clothes dryer 400.

With continued reference to FIG. 7, the clothes dryer 400 also includes wiring 600. The wiring 600 can take a variety of forms and can be routed in a variety of ways. As seen in FIG. 7, the wiring 600 is connected to the control unit 436, the heater 454, the blower 464, a light 470 that illuminates the inside of the drum 417, and the housing 412 to provide a ground path 462. In the illustrated embodiment, the wiring 600 is routed along the back of the clothes dryer 400 between the ducts 456, 466. The illustrated wiring 600 is routed from the heater 454 and blower 464, to the light 470, to the top of and through the rear panel 425, through top panel 428 at the rear of the top panel 428, and to the control panel 430.

As seen in FIG. 7, the clothes dryer 400 includes an insulator 416 to shield the wiring 600, electrical control components in the electronic control unit 436, and/or other components from heat generated by the heater 454 and circulated through the drum 417. The insulator 416 may be used to at least partially cover one or more apertures 444 within the housing 412 to prevent fire from exiting the clothes dryer housing 412 per the UL 2158 standard. In addition, the insulator 416 may be positioned between metal mating surfaces 421 of the clothes dryer housing 412. Such an arrangement of the insulator 416 may also prevent fire from exiting the clothes dryer housing 412.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The appliances of the present disclosure can comprise, consist of, or consist essentially of the essential elements and limitations of the disclosure as described herein, as well as any additional or optional components or limitations described herein or otherwise useful in appliance applications.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular. Furthermore, when the phrase "at least one of A and B" is employed it is intended to mean "only A, only B, or both A and B."

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices and systems disclosed. It is sought, therefore, to cover all such changes and modifications as fall within the spirit and scope of the general inventive concepts, as described and/or claimed herein, and any equivalents thereof.

What is claimed is:

1. An acoustically insulated appliance comprising:
an appliance having an internal source of noise; and
a cellulose-based insulator having a basis weight of 80 $g/m^2$ to 540 $g/m^2$ and an airflow resistance of 500 mks rayls to 2,500 mks rayls,
wherein a side of the cellulose-based insulator having the largest surface area is positioned to face toward the internal source of noise, and
wherein the cellulose-based insulator comprises cellulose fibers and a flame retardant.

2. The acoustically insulated appliance of claim 1, wherein the cellulose-based insulator has a flammability rating of UL94 V-0.

3. The acoustically insulated appliance of claim 2, wherein the cellulose-based insulator has a flammability rating of UL94 HB and UL94-5VA.

4. The acoustically insulated appliance of claim 1, wherein the cellulose-based insulator has a basis weight of 150 $g/m^2$ to 225 $g/m^2$ and an airflow resistance of 1,000 mks rayls to 1,500 mks rayls.

5. The acoustically insulated appliance of claim 1, further comprising an insulation member, wherein the cellulose-based insulator is attached to the insulation member.

6. The acoustically insulated appliance of claim 5, wherein the insulation member is selected from a high-loft polyester batt, a fiberglass batt, a fibrous polymer mat, a mineral wool batt, and a natural fiber batt.

7. The acoustically insulated appliance of claim 1, wherein the appliance is a dishwasher and the internal source of noise is at least one of a pump and a motor of the dishwasher.

8. The acoustically insulated appliance of claim 1, wherein the appliance is a clothes washer and the internal source of noise is a motor of the clothes washer.

9. A thermally insulated appliance comprising:
an appliance having a housing and an internal source of heat positioned within the housing; and
a cellulose-based insulator having a basis weight of 80 $g/m^2$ to 540 $g/m^2$ and an airflow resistance of 500 mks rayls to 2,500 mks rayls,
wherein the cellulose-based insulator insulates at least a portion of the housing, and
wherein the cellulose-based insulator comprises cellulose fibers and a flame retardant.

10. The thermally insulated appliance of claim 9, wherein the cellulose-based insulator has a flammability rating of UL94 V-0.

11. The thermally insulated appliance of claim 10, wherein the cellulose-based insulator has a flammability rating of UL94 HB and UL94-5VA.

12. The thermally insulated appliance of claim 9, wherein the internal source of heat generates a temperature of 48° C. to 260° C. within the housing.

13. The thermally insulated appliance of claim 9, wherein the cellulose-based insulator has a basis weight of 150 $g/m^2$ to 225 $g/m^2$ and an airflow resistance of 1,000 mks rayls to 1,500 mks rayls.

14. The thermally insulated appliance of claim 9, wherein the housing includes mating metal surfaces and the cellulose-based insulator is at least partially positioned between the mating metal surfaces.

15. The thermally insulated appliance of claim 9, wherein the housing includes one or more apertures and the cellulose-based insulator at least partially covers at least one of the apertures.

16. The thermally insulated appliance of claim 9, wherein the thermally insulated appliance is an oven range.

17. The thermally insulated appliance of claim 9, wherein the thermally insulated appliance is a clothes dryer.

18. An acoustically and thermally insulated appliance comprising:
an appliance having a housing, an internal source of noise, and an internal source of heat positioned within the housing; and
a cellulose-based insulator having a basis weight of 80 $g/m^2$ to 540 $g/m^2$ and an airflow resistance of 500 mks rayls to 2,500 mks rayls,
wherein a side of the cellulose-based insulator having the largest surface area is positioned in the appliance to face toward the internal source of noise, and the cellulose-based insulator insulates at least a portion of the housing, and
wherein the cellulose-based insulator comprises cellulose fibers and a flame retardant.

19. The acoustically and thermally insulated appliance of claim 18, wherein the cellulose-based insulator has a flammability rating of UL94 V-0.

20. The acoustically and thermally insulated appliance of claim 19, wherein the cellulose-based insulator has a flammability rating of UL94 HB and UL94-5VA.

21. The acoustically and thermally insulated appliance of claim 18, wherein the internal source of heat generates a temperature of 48° C. to 260° C. within the housing.

22. The acoustically and thermally insulated appliance of claim 18, wherein the cellulose-based insulator has a basis weight of 150 g/m² to 225 g/m² and an airflow resistance of 1,000 mks rayls to 1,500 mks rayls.

* * * * *